United States Patent [19]

Vossieck et al.

[11] Patent Number: 4,591,167
[45] Date of Patent: May 27, 1986

[54] SLIDE RING SEAL WITH PRE-CONTOURED BELLOWS

[75] Inventors: Paul Vossieck; Karl vom Stein, both of Burscheid, Fed. Rep. of Germany

[73] Assignee: Goetze AG, Burscheid, Fed. Rep. of Germany

[21] Appl. No.: 784,266

[22] Filed: Oct. 4, 1985

[30] Foreign Application Priority Data

Oct. 6, 1984 [DE] Fed. Rep. of Germany ....... 3436798

[51] Int. Cl.$^4$ .............................................. F16J 15/36
[52] U.S. Cl. .......................................... 277/88; 277/1; 277/92; 277/212 FB
[58] Field of Search ............. 277/81 R, 85, 86, 88–90, 277/92, 95, 212 FB, 1

[56] References Cited

U.S. PATENT DOCUMENTS

| | | | |
|---|---|---|---|
| 2,464,988 | 3/1949 | Payne | 277/88 X |
| 2,555,675 | 6/1951 | Chambers et al. | 277/89 |
| 2,556,133 | 6/1951 | Bright | 277/89 X |
| 2,692,787 | 10/1954 | Brummer | 277/89 X |
| 2,949,322 | 8/1960 | Closs . | |
| 3,117,793 | 1/1964 | Hauser et al. | 277/89 X |
| 3,782,735 | 1/1974 | Novosad . | |

FOREIGN PATENT DOCUMENTS

| | | |
|---|---|---|
| 1858504 | 9/1963 | Fed. Rep. of Germany . |
| 7829170 | 1/1979 | Fed. Rep. of Germany . |
| 2648323 | 3/1980 | Fed. Rep. of Germany . |
| 7031416 | 4/1972 | France . |
| 8123779 | 6/1983 | France . |
| 2001710 | 2/1979 | United Kingdom ......... 277/212 FB |

Primary Examiner—Robert S. Ward
Attorney, Agent, or Firm—Spencer & Frank

[57] ABSTRACT

A slide ring seal for sealing a machine component relative to a pressurized media. A slide ring is provided which is axially slidably mountable on the machine component. A bellows is arranged for surrounding an axial portion of the machine component. The bellows has one axial end connected with the slide ring and a second axial end. The bellows includes a sealing member at the second axial end for sealing the machine component with respect to the pressurized media. The bellows has a region between the slide ring and the sealing member which, in a relaxed state of the bellows, has a shape approximately corresponding to the contour of the region that will develop when the bellows is subjected to operating pressures in an installed state of the slide ring seal. A compression spring is arranged to be concentrically mounted on the machine component with respect to the slide ring and the bellows and is disposed between the slide ring and the sealing member.

14 Claims, 7 Drawing Figures

SLIDE RING SEAL WITH PRE-CONTOURED BELLOWS

BACKGROUND OF THE INVENTION

The present invention relates to a slide ring seal for sealing a pressurized media relative to a machine component, such as a shaft, and in particular to a seal including a slide ring, a bellows having one axial end connected with the slide ring and another axial end designed as a sealing member, and a compression spring arranged concentrically with respect to the slide ring and bellows and extending axially between the sealing member and the slide ring.

German Pat. No. 2,648,323 discloses a slide ring seal in which the bellows is held without tension by means of a holding cap in a centered installation position within the housing that surrounds it. Without the provision of a holding cap, the compression spring which cooperates with the bellows, usually produces tensile stresses in the rubber bellows, which over long periods of time result in damage to the bellows. To avoid this, the bellows is vulcanized in the installation position and is held in a centered installation position by means of the holding cap. This type of slide ring seal is generally suitable only for use under relatively low pressures, i.e to about 1 bar. Under greater pressures, the bellows, which is mounted without tension within the slide ring seal, would be deformed and thus destroy the equilibrium of forces within the bellows.

Bellows having a variety of contours in the region between the slide ring and the sealing member of the bellows are known in the art. For example, German Utility Model Pat. No. 1,858,504 discloses a corrugated bellows while German Pat. No. 2,225,776 and corresponding U.S. Pat. No. 3,782,735 disclose a bellows which, when seen in the longitudinal direction, has an approximately U-shaped configuration. None of these seals can be used under high pressure conditions since the bellows would be deformed and could possibly be sheared off at the projecting edges of corresponding structural components.

SUMMARY OF THE INVENTION

It is therefore an object of the present invention to provide a slide ring seal which is composed of relatively few parts and which can be used under high pressure conditions without the deformation of the bellows resulting in drawbacks with respect to the sealing effect.

The above and other objects are accomplished according to the invention wherein a slide ring seal is provided for sealing a machine component relative to a pressurized media, including: a slide ring slidably mountable on the machine component; a bellows arranged for surrounding an axial portion of the machine component and having one axial end connected with the slide ring and a second axial end, the bellows including a sealing means at the second axial end for sealing the machine component with respect to the pressured media, the bellows having a region between the slide ring and the sealing means which, in a relaxed state of the bellows, has a shape approximately corresponding to the contour of the region that will develop when the bellows is subjected to operating pressures in an installed state of the slide ring seal; and a compression spring arranged to be concentrically mounted with respect to the slide ring and the bellows and disposed between the slide ring and the sealing means.

Accordingly, the present invention provides a slide ring seal in which the manufactured shape of the bellows corresponds approximately to the contour which results during operation under pressure. With this measure, it is assured that the bellows, when under pressure, is minimally, if at all, deformed. The equilibrium of forces remains essentially the same and the service life of the bellows, and hence of the seal, is increased. By adapting the bellows, or more particularly its contour, to the maximum pressures occurring during operation, the bellows can be used for the most varied of applications.

In one embodiment of the invention, the bellows extends at least partially parallel to the frontal face, which is axially opposite the slide face of the slide ring. It is likewise possible and also desirable for the bellows, in the region between the slide ring and sealing member, to be at least partially parallel to the machine component to be sealed, which is preferably a shaft. As a result of this configuration of the bellows, these flattened regions of the otherwise rounded bellows are subjected to pressure, without being additionally deformed, and rest against the shaft and the frontal face of the slide ring, respectively. By pre-shaping the bellows in the way that it appears in fact when installed and under pressure, otherwise occurring stresses are positively prevented beforehand. The bellows thus receives its optimized shape at the time of manufacture.

Before the seal is installed, the flattened regions extend preferably at a defined distance from the corresponding counterfaces of the slide ring and the shaft. The gap is closed by the action of external pressure, be it by the act of installation itself or by the pressurized medium. In the axial region between slide ring and sealing member of the bellows, the bellows preferably has an approximately Z-shaped cross section.

According to a further feature of the invention, the region of the bellows comprising the sealing member is supported on a separate axial abutment which cooperates with the machine component. This abutment is preferably formed by a ring which is placed into a circumferential groove of the machine component and which is cut open at a location in its circumferential region. This measure provides axial support for the bellows without further clamping elements and is used specifically for shafts which are continuous. According to a further feature of the invention, the ring is designed as an internally tensioning piston ring.

It is likewise conceivable to form a double-action slide ring seal by using a second seal, composed of slide ring, bellows and compression spring, which is likewise supported on an axial abutment and acts in the opposite axial direction. Preferably, the mirror-image frontal regions of the bellows, which constitute the sealing members, extend beyond their respective axial abutment surfaces and contact one another to thus form a further seal.

As an alternative to the two-part embodiment, discussed above, the bellows can comprise a one-piece double bellows which cooperates with the machine component in its axially center region to thus form a double-action slide ring seal. Such sealing elements are generally disclosed, in German Utility Model Patent No. 78/29,170. However, the basic idea of the present invention is not the configuration of a double-action slide ring seal per se, but rather the transfer of the inventive idea from single-action slide ring seals to those which form a seal in two directions. Here, too, the bellows contour is optimized, i.e. adapted to the respective pressure conditions during operation. Preferably, the central sealing member in the double action slide ring seal according to this embodiment of the invention is pressed between the two slide rings against the corresponding machine element by means of a radially acting clamping element. The spring producing the contact pressure may be made of one piece extending between the two slide rings or of two pieces.

The present invention further involves a method for producing a bellows for use in either a single or double-action slide ring seal of the foregoing type, wherein the bellows is comprised of a vulcanized elastomer material. The method includes: providing a bellows which has a shape approximately corresponding to a later contour of the bellows when a slide ring seal containing such bellows is assembled and brought under operating pressure; providing an assembly, including such bellows, which corresponds to a slide ring seal under operating pressure so as to place such bellows in a deformed state; forming a negative mold of a desired contour of a bellows by inserting molding material into a space having a contour defined by the deformed bellows; and utilizing the negative mold to produce a bellows having the desired contour.

This method makes it possible to determine wherein tension peaks occur in the individual bellows regions. Such tension peaks may be reduced, for example, by partial removal of material.

The invention is illustrated in the drawings and will be described in greater detail below.

DESCRIPTION OF THE PREFERRED EMBODIMENTS

Figure 1:
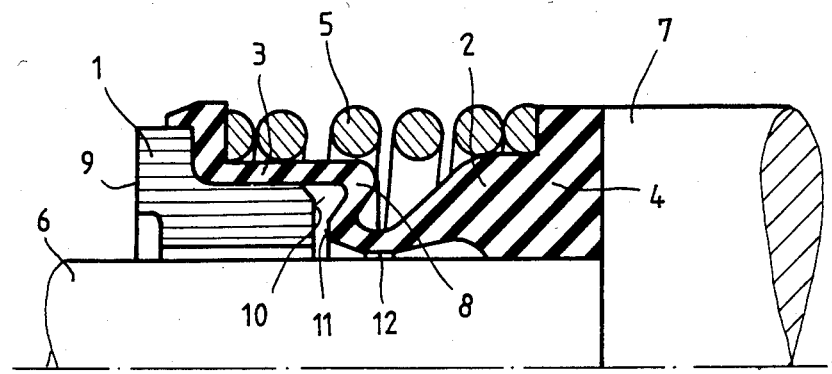
FIG. 1 is an axial sectional view of a single-action slide ring seal having an optimized bellows according to one embodiment of the invention.

P FIG. 1 shows a single-action slide ring seal according to the invention. It is composed of an angular slide ring 1, a bellows 2, having one axial end 3 connected with slide ring 1 and another axial end 4 designed as a sealing member, and a cylindrical compression spring 5 which extends between sealing member 4 and slide ring 1. Slide ring 1 has a slide face 9 at one axial end and a frontal face 10 at the opposite axial end. Sealing member 4 cooperates with a shaft 6 to form a seal therewith and is axially supported at a shaft projection 7. Bellows 2 is shaped axially between slide ring 1 and sealing member 4 to present an approximately Z-shaped cross section. Its manufactured shape is adapted to the approximate contour that will develop during operation under pressure so that stresses during operation will not occur at all or will be minimized. For this purpose, bellows 2 is provided with a flattened face 11 in the region of frontal face 10 and is at least partially parallel to frontal face 10. Analogously, bellows 2 is provided with a flattened bellows region 12 which is essentially parallel to shaft 6. In the uninstalled state, flattened regions 11 and 12 do not contact their corresponding counterfaces 10 and 6, respectively, and are preferably at a predetermined distance from such counterfaces.

Figure 2:
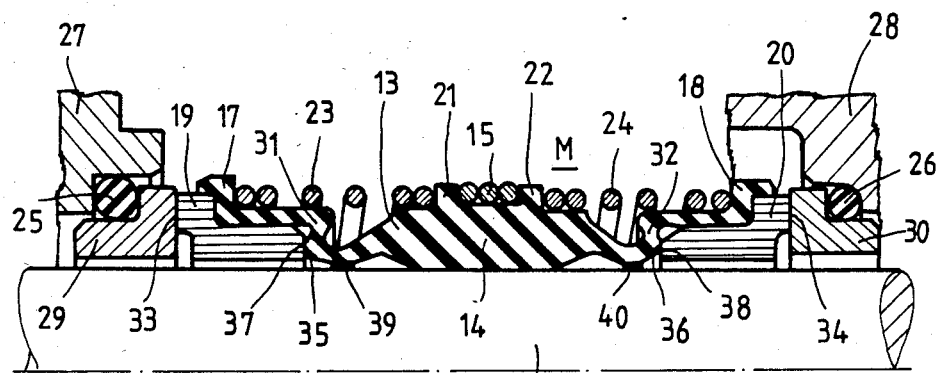
FIG. 2 is an axial sectional view of a double-action slide ring seal having a one-piece bellows with optimized cross section according to another embodiment of the invention.

FIG. 2 shows an installed double-action slide ring seal which incorporates the principles of the invention. The slide ring seal of FIG. 2 is composed of a one-piece bellows 13 in mirror-image design. An axially central region 14 is designed as a sealing member and is pressed radially against shaft 16 by means of a clamping element 15 in the form of a spring that is axially supported at radial projections 21 and 22 of bellows 13. Two slide rings 19 and 20 are incorporated in the axially outer regions 17 and 18, respectively, of bellows 13. Slide rings 19 and 20 each have a slide face 33 and 34, respectively at one axial end thereof and a frontal face 37 and 38, respectively, at an opposite axial end. A cylindrical compression spring 23 extends axially between slide ring 19 and radial projection 21 and a cylindrical compression spring 22 extends axially between slide ring 20 and radial projection 22. Slide rings 19 and 20 cooperate with two counterrings 29 and 30, respectively, which are statically sealed against receiving members 27 and 28, respectively, by means of respective O-rings 25 and 26.

According to the present invention, the manufactured shape of bellows 13 corresponds approximately to the contour developing during operation under pressure. Thus, in the region of the two slide rings 19 and 20, the respective bellows contour 31 and 32 has approximately the shape of a Z. Further, bellows 13 is provided with bellows regions 35 and 36, which are disposed adjacent to frontal faces 37 and 38, respectively, and which are flattened and rest, under pressure from medium M to be sealed, against the frontal faces 37 and 38. Analogously, bellows 13 is provided with regions 39 and 40, which cooperate with shaft 16, and likewise have a flattened shape.

Figure 3:
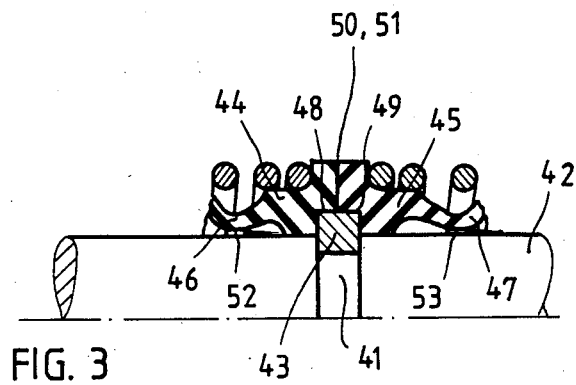
FIG. 3 is an axial sectional view of a seal that can be used as a two-part, double-action slide ring seal according to yet another embodiment of the invention.

FIG. 3 shows a partial axial section of a slide ring seal similar to that shown in FIG. 1, with the difference that it is intended to form a double-action slide ring seal (only partially shown), in which two mirror-image seals are employed. In order to axially support the two seals, a ring 43, preferably a piston ring, is provided which is seated in a groove 41 in a shaft 42 and which provides radially inward tension. Bellows 46 and 47 (partially shown) are provided with sealing members 44 and 45, respectively, each of which is provided with a respective circumferential groove 48 and 49. Sealing members 44 and 45 have respective faces 50 and 51 which face toward one another. Grooves 48 and 49 permit sealing members 44 and 45 to be pushed axially onto piston ring 43, with their facing frontal faces 50 and 51 contacting one another in a sealing manner. Bellows 46 and 47 are additionally provided with respective flattened portions 52 and 53 which cooperate with shaft 42.

Figure 4:
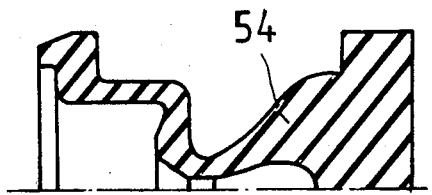
FIG. 4 shows an axial sectional view of a first bellows for forming a vulcanisation mold.
Figure 5:
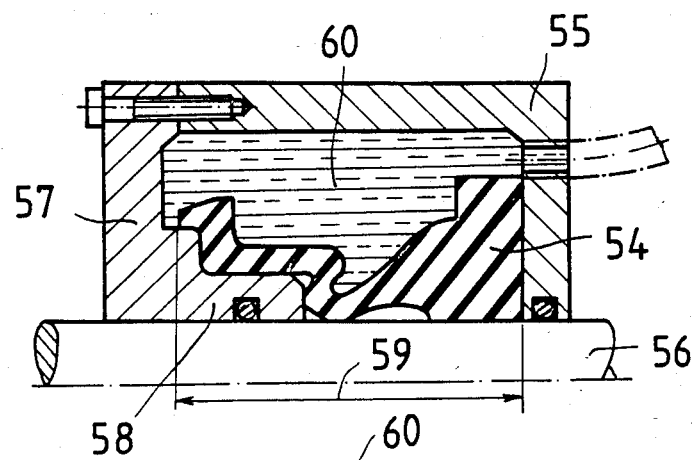
FIG. 5 shows a cross sectional view of a housing for deforming the first bellows shown in FIG. 4.
Figure 6:
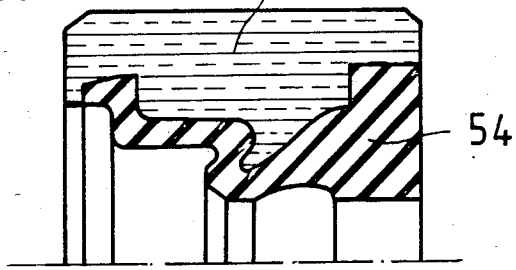
FIG. 6 shows an axial sectional view of the deformed bellows together with a plastic compound.
Figure 7:
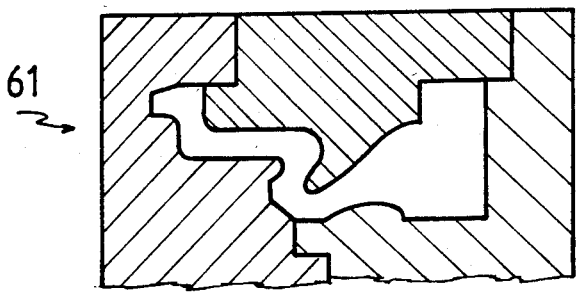
FIG. 7 shows a cross view of a vulcanisation mold for producing the specially formed bellows according to the invention.

FIGS. 4 to 7 illustrate a method for producing a bellows according to the invention for use in a simple slide ring seal for example as shown in FIG. 1. The first step is forming a first bellows 54, as shown in FIG. 4, which has a shape approximately corresponding to a later contour of the bellows 2 (FIG. 1) when a slide ring seal containing such bellows is assembled. The first bellows 54 consisting of an elastomeric material is produced by a well-known vulcanisation process. FIG. 5 shows the first bellows 54 installed in a housing including a shaft 56, with the same diameter as shaft 6 in FIG. 1 and a cover unit 57 with an axial extension 58 corresponding to the contour of the slide ring 1 in FIG. 1. The axial distance 59 is the same when the second bellows 2 is assembled for sealing action. The housing 55 is filled with a cold hardened plastic material 60 such as Technovit 3040. The first liquid plastic material will be brought under the same degree of compression as produced by the operation pressure of the slide ring seal. After hardening of the plastic material 60 it is removed out of the housing 55 together with the bellows 54 which is deformed as shown in FIG. 6. This contour of the first bellows 54 is the master for forming a negative vulcanisation mold 61 as shown in FIG. 7 to produce a bellows 4 having the desired contour.

This method of forming a bellows has the advantage that the bellows will be free of any internal tension after installation that is after the bellows 2 together with the slide ring 1 and the compression spring 5 are operatively combined with a machine component and placed under media pressure to form a slide ring seal. A bellows formed in this manner will have a longer functional life.

It will be understood that the above description of the present invention is susceptible to various modifications, changes and adaptations, and the same are intended to be comprehended within the meaning and range of equivalents of the appended claims.

What is claimed is:

1. Slide ring seal for sealing a machine component relative to a pressurized media, comprising:
   a slide ring axially slidably mountable on a machine component;
   a bellows arranged for surrounding an axial portion of the machine component and having one axial end connected with said slide ring and a second axial end, said bellows including a sealing means at said second axial end for sealing the machine component with respect to the pressured media, said bellows having a region between said slide ring and said sealing means which, in a relaxed state of said bellows, has a shape approximately corresponding to the contour of said region that will develop when said bellows is subjected to operating pressures in an installed state of said slide ring seal; and
   a compression spring arranged to be concentrically mounted on the machine component with respect to said slide ring and said bellows and disposed between said slide ring and said sealing means.

2. Slide ring seal as defined in claim 1, wherein said slide ring has one axial end presenting a slide face and an opposite axial end presenting a frontal face; and said bellows has an area which extends at least partially parallel to said frontal face when said bellows is in a relaxed state.

3. Slide ring seal as defined in claim 2, wherein said region of said bellows between said slide ring and said sealing means has a second area which extends at least partially parallel to the machine component and said area and said second area each have a flattened surface which is provided during the manufacture said bellows.

4. Slide ring seal as defined in claim 1, wherein said region between said slide ring and said sealing means, said bellows has an area which extends at least partially parallel to the machine component to be sealed when said bellows is in a relaxed state.

5. Slide ring seal as defined in claim 1, wherein the machine component and said slide ring each have a counterface and said region of said bellows between said slide ring and said sealing means has flattened areas which are disposed to be adjacent to the respective counterfaces of said slide ring and of the machine component and said flattened areas are each arranged to be at a defined distance with a respective one of the counterfaces in the relaxed state of said bellows.

6. Slide ring seal as defined in claim 1, wherein said region of said bellows between said slide ring and said sealing means has an approximately Z-shaped cross section.

7. Slide ring seal as defined in claim 1, forming a combination with the machine component and further comprising a separate axial abutment which cooperates with said machine component, said sealing means being supported by said separate axial abutment.

8. Combination as defined in claim 7, wherein said machine component has a circumferential groove and said axial abutment is composed of a ring embedded in said circumferential groove, said ring being cut open in a location on its circumference.

9. Combination as defined in claim 8, wherein said ring is an internally tensioning piston ring.

10. Combination as defined in claim 8, wherein said slide ring seal constitutes a first slide ring seal and further including a second slide ring seal composed of a second slide ring, a second bellows and a second compression spring constructed and cooperating in the same manner as in said first slide ring seal and being supported at at least said axial abutment.

11. Combination as defined in claim 10, wherein said bellows and said second bellows have mirror image regions presenting respective frontal faces, said ring presents opposite radial abuatment surfaces, and said frontal faces each extend beyond a corresponding one of said axial abutment surfaces and touch one another.

12. Slide ring seal as defined in claim 1, wherein said bellows comprises a double bellows having an axially centered region which is arranged for cooperation with the machine component to form a double-action slide ring seal.

13. Slide ring seal as defined in claim 12, including a radially acting clamping means disposed around said axially centered region for pressing said axially centered region against the machine component.

14. Method for producing a bellows for use in a slide ring seal as defined in claim 1, the bellows being comprised of a vulcanized elastomer material, said method comprising:

provicing a bellows which has a shape approximately corresponding to a later contour of the bellows when a slide ring seal containing such bellows is assembled and brought under operating pressure;

providing an assembly, including such bellows, which corresponds to a slide ring seal under operating pressure so as to place such bellows in a deformed state;

forming a negative mold of a desired contour of a bellows by inserting molding material into a space having a contour defined by the deformed bellows; and utilizing the negative mold to produce a bellows having the desired contour.

* * * * *